Dec. 6, 1955 W. L. THOMAS ET AL 2,726,145
COUNTERCURRENT EXTRACTION APPARATUS
Filed Aug. 17, 1951 4 Sheets-Sheet 1
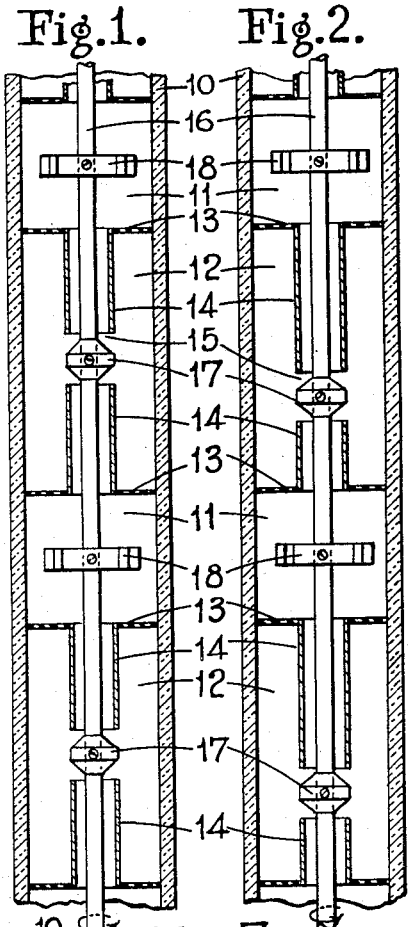
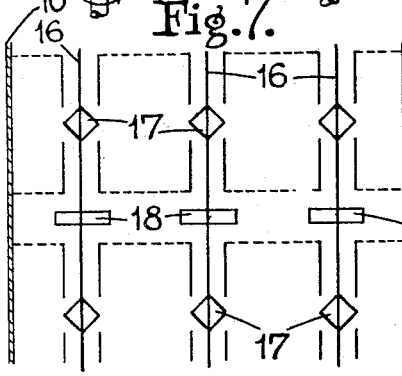
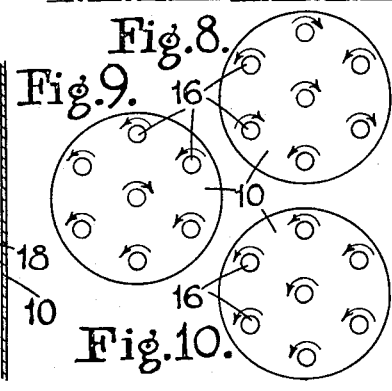
Inventors: William Llewelyn Thomas
Peter Desmond Holmes
By: *Morgan, Finnegan & Durham*
Attorneys.

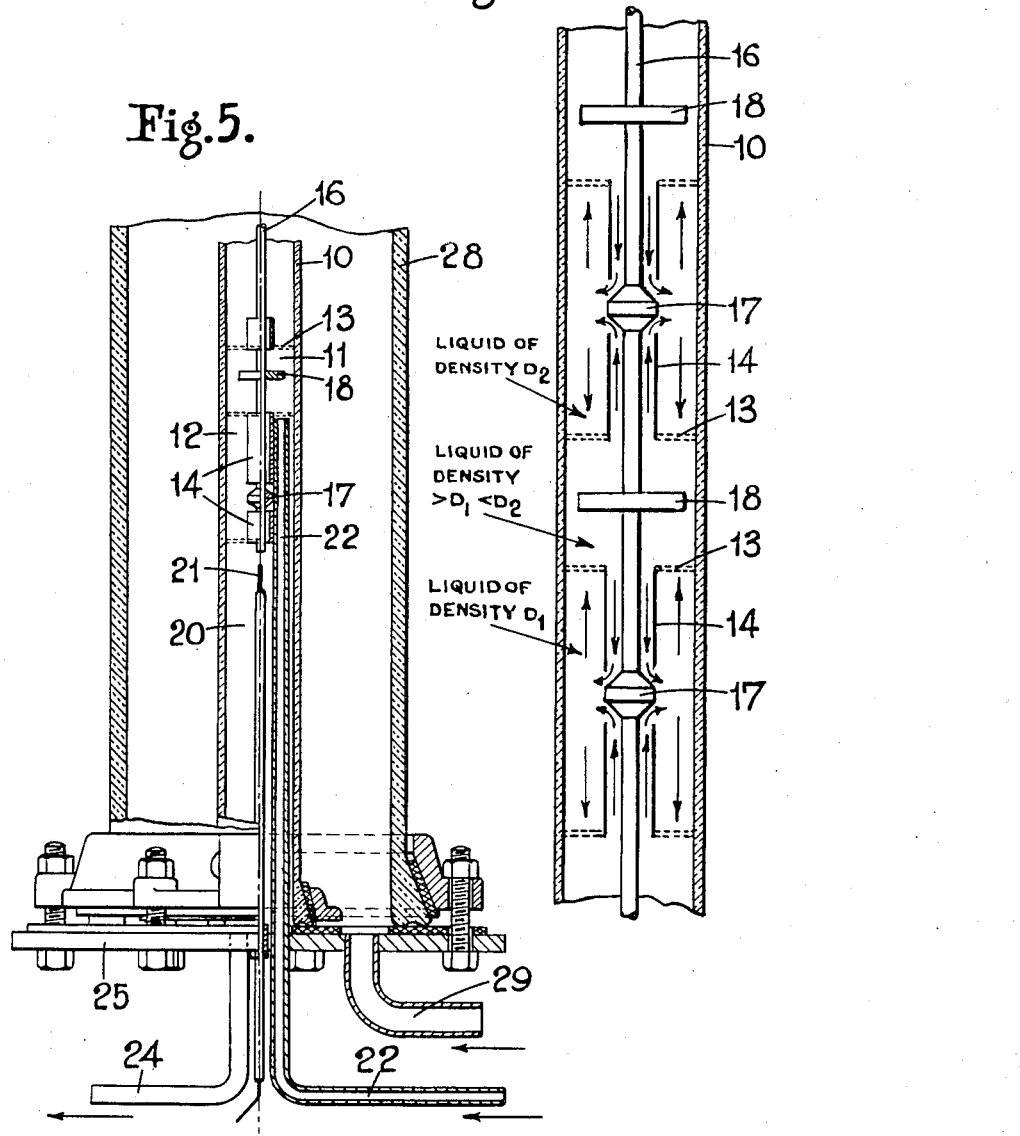

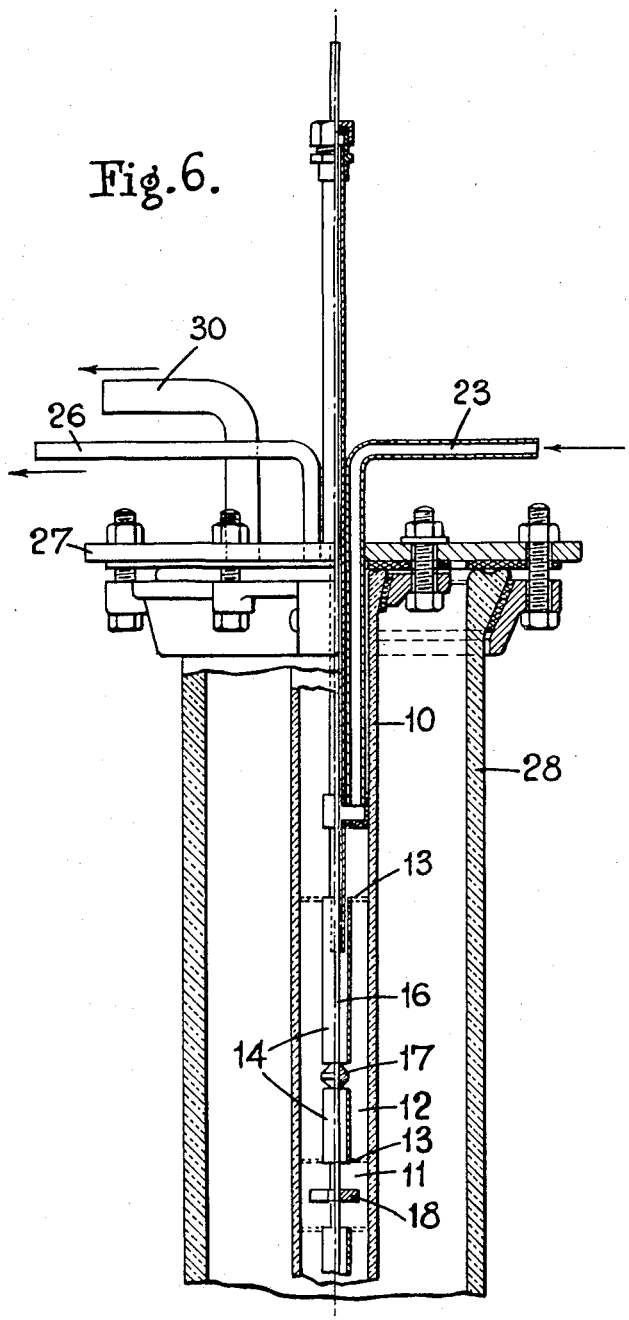

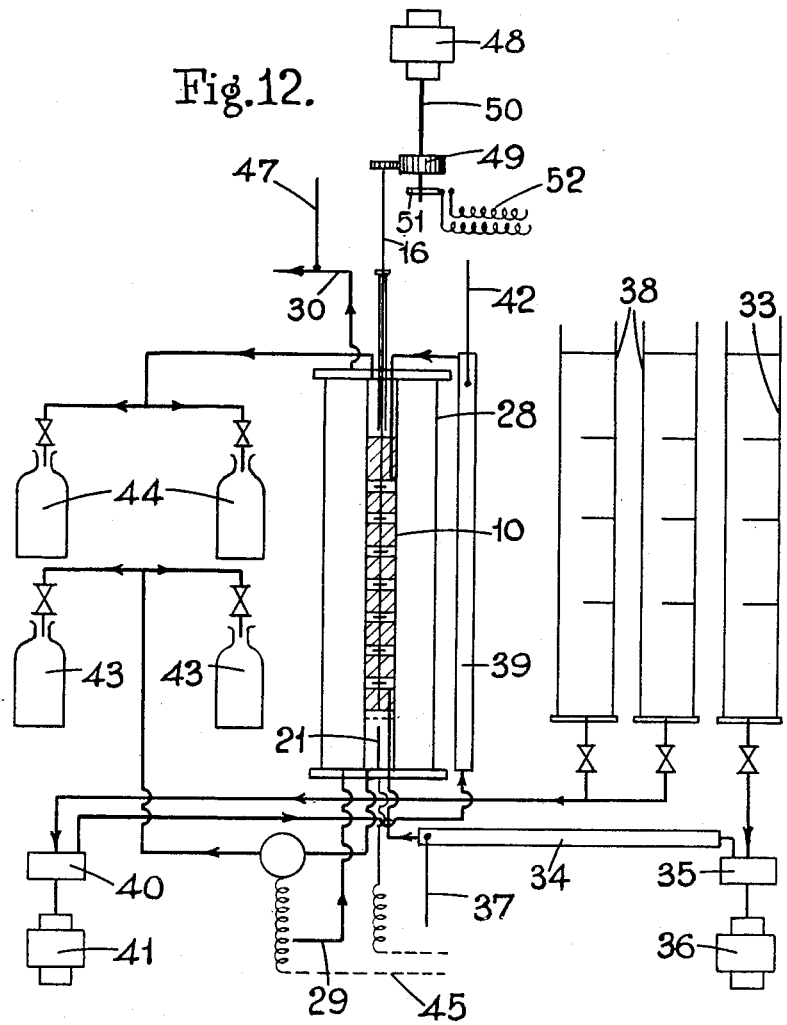

United States Patent Office 2,726,145
Patented Dec. 6, 1955

2,726,145

COUNTERCURRENT EXTRACTION APPARATUS

William Llewelyn Thomas and Peter Desmond Holmes, Sunbury-on-Thames, England, assignors to The British Petroleum Company Limited Application August 17, 1951, Serial No. 242,228

Claims priority, application Great Britain August 23, 1950

7 Claims. (Cl. 23—270.5)

This invention relates to apparatus for the countercurrent extraction of liquid mixtures by means of selective solvents and is of particular application to apparatus for the separation of undesirable constituents from lubricating oil base stocks.

A common form of apparatus for carrying out countercurrent extraction consists of a column which is filled with a packing material in order to promote intimate contact between the solvent and the mixture to be extracted which are introduced at opposite ends of the column. To secure efficient extraction, it is necessary for the packed height of the column to be considerable and it would obviously be a great advantage if it were possible to reduce the height of the column without reducing the efficiency of extraction or the throughput. With this advantage in mind, a column has been proposed comprising alternate mixing and settling zones, the theory being that the solvent and the mixture are brought into intimate contact in the mixing zones, while the mixture is allowed to separate in the settling zones. In order to secure efficient separation in the settling zones, it has been considered necessary to provide packing in said zones with the result that although it has been possible to reduce the height of the column without loss of extraction efficiency, it has not been possible to operate the column with throughputs as high as those obtainable with the normal packed column. On the other hand, efficient separation is not achieved merely by the provision of free space zones between the mixing zones.

The present invention seeks to provide a column having alternate mixing and settling zones by means of which the height of the column may be considerably reduced without loss of extraction efficiency or throughput and without the use of packing in the settling zones.

According to the present invention, apparatus for the countercurrent extraction of a liquid mixture by means of a selective solvent consists of a vertical column comprising mixing zones alternating with unobstructed settling zones, means being provided to pass the mixture from each mixing zone to inner intermediate positions in the adjacent settling zones and to direct the mixture outwardly within said settling zones.

In using the apparatus according to the invention for the extraction of mixtures of petroleum hydrocarbons, it is preferred to operate with the oil to be extracted as the continuous phase and the solvent as the dispersed phase, the oil being fed in at the base of the column and the solvent at the top. It is possible, however, to operate with the solvent as the continuous phase with the oil passing upwards as the dispersed phase.

In carrying the invention into effect according to one embodiment as applied to the extraction of lubricating oil base stocks, the column is divided into a plurality of zones by means of perforated screens conveniently consisting of wire gauze. The screens are formed with central apertures through which passes a driven shaft centrally located within the column and a paddle is secured to the shaft in alternate zones whereby said zones constitute mixing zones. Vertical tubes are secured in the apertures in the perforated screens, said tubes extending into the free spaces between the mixing zones and the tubes in each free space zone terminating a short distance from each other. Secured to the shaft in each free space zone is a double conical baffle member which is located between the ends of the tubes in said zones, said member having a diameter at least equal to the internal diameter of said tubes.

The top and bottom zones in the column are settling zones. The ends of the column are closed by plates, the top plate carrying the solvent inlet pipe, the raffinate outlet pipe and a tube for shielding the upper end of the rotor shaft, while the lower plate carries the oil feed inlet pipe and the extract outlet pipe. The solvent may be admitted to the top settling zone or to the top mixing zone and the interface between the two phases may be controlled at a point below the oil feed inlet.

If desired, more than one shaft may be supported within the column, each shaft being provided with baffle members and with surrounding tubes secured to the perforated screens, as hereinbefore described.

In using the column, the raffinate phase passes up the column as the continuous phase, the solvent passing down the column under gravity. The solvent phase enters each mixing zone via the top gauze of the zone and thorough mixing of the solvent phase with the ascending raffinate phase occurs in this zone. The major part of the solvent phase leaves the mixing zone by passing down the upper tube of the settling zone next below into which it emerges after deflection by the conical baffle. In the settling zone, the bulk of the solvent separates and collects on the bottom gauze of the zone through which it passes to the next mixing zone below. Most of the finely dispersed solvent separates out in the region around the upper tube in the settling zone and collects with the major part of the solvent around the lower tube in said zone. However, some of the solvent phase from each mixing zone passes up the lower tube in the settling zone next above, is deflected outwardly by the conical baffle and collects with the bulk of the solvent phase around said lower tube.

A laboratory column according to the invention will now be described by way of example with reference to the accompanying drawings wherein:

Figure 1 illustrates one arrangement of the column,

Figure 2 illustrates another arrangement of the column,

Figure 3 shows one method of assembling the parts within the column,

Figure 4 shows another method of assembling the parts within the column,

Figure 5 is an enlarged view of the base of the column,

Figure 6 is an enlarged view of the top of the column,

Figures 7 to 10 illustrate various arrangements of multishaft columns,

Figure 11 illustrates diagrammatically the principle on which the columns operate, and Figure 12 shows a solvent extraction plant incorporating a column according to the invention.

Referring first to Figures 1, 5 and 6, the column 10 is divided into mixing zones 11 and settling zones 12 by means of horizontal circular gauze discs 13. Tubes 14 are located in each settling zone and are secured in holes in the discs 13, the upper and lower tubes in each settling zone being equal in length and leaving a short space 15 between their adjacent ends. A rotor shaft 16 passes centrally through the column and double-conical baffles 17 are secured to said shaft and are equally spaced between the pairs of tubes 14. Rotors 18 are secured to the shaft 16 and are centrally located in the mixing zones 11, the rotors being formed with grooves 19 to increase turbulence (Figures 3 and 4).

Oil is fed continuously to the base of the column and solvent to the top, the extract phase, the discontinuous phase, being settled in the zone 20 at the base of the column and the raffinate phase, the continuous phase, overflowing from the top of the column, the interphase between the two phases being controlled electrically by means of the electrode 21. The oil is fed through pipe 22 into the bottom mixing zone 11 and solvent is fed through pipe 23 into the upper tube 14 in the top settling zone 12. Extract phase leaves the column through the pipe 24, connected to the bottom end plate 25 and raffinate phase leaves the column through the pipe 26 connected to the top end 27. The column is surrounded by a water jacket 28 which is provided with an inlet 29 and an outlet 30.

Referring to Figure 2, the arrangement of the column is substantially the same as that of Figure 1 except that the upper tubes 14 in the settling zones are longer than the lower tubes, the position of the baffles 17 being varied accordingly. This arrangement provides increased settling capacity for the raffinate phase at the expense of the extract phase since it has been found that this differential between the settling capacities is desirable.

One method of assembling the parts within the column is illustrated in Figure 3. The gauze discs 13, with the tubes 14 secured thereto, are secured to a length of semi-cylindrical metal foil 31 which fits closely to the wall of the column. This arrangement is apt to give rise to channelling of solvent between the wall of the column and the foil 31. As shown in Figure 4 therefore, the gauze discs 14 are secured to a pair of diametrically opposed metal rods 32.

A column comprising a plurality of rotor shafts 16 is illustrated diagrammatically in Figure 7, the rotors 18 at each level being located in the same horizontal plane. All the shafts 16 may rotate in the same direction (Figure 10), the central shaft may rotate in the opposite direction to the surrounding shafts (Figure 9), or each shaft of the shafts grouped around the central shaft may rotate in the opposite direction to the central shaft (Figure 8). The arrangement of Figure 8 is preferred inasmuch as it produces the smallest extent of vertical movement in the settling zone, such vertical movement tending to reduce the efficiency in the settling zone.

The principle of operation of a contacting column according to the present invention is diagrammatically illustrated in Figure 11. The oil and solvent passing countercurrently to each other become intimately mixed in each mixing zone. Depending on the ratio of oil to solvent, the density of the resulting mixture assumes some value intermediate that of the oil and that of the solvent. Rotation of the conical baffles situated in the settling zones imparts a centrifugal action to the liquid surrounding them and induces movement of the mixed phase from the adjacent mixing zones through the central tubes passing to the mid point of the settling zones (as indicated by the arrows in Figure 11). The mixture of the two phases now enters quiescent zones where separation occurs, the lighter raffinate phase rising to the top of the settling zones, while the heavier extract phase moves downwards. It will be obvious that the density of the mixture within the central tube in the upper half of each settling zone is greater than that of the raffinate phase surrounding the tube. The raffinate phase is therefore displaced upwards by gravity and passes through the gauzes separating the mixing and settling zones to the mixing zones where it is brought into contact with an extract phase which has similarly been displaced from the settling zones above. Channelling of the liquid through the central tubes cannot occur because of the rotation of the conical baffles and moreover the diameters of the latter are slightly greater than those of the central tubes.

The distinguishing characteristic of a column according to the present invention as compared with a Scheibel column is that the movement of each phase entering the mixing zones, and of the mixture of the two phases leaving the mixing zones occurs along different paths. Greater limiting throughputs are therefore possible with this type of column than with those using packed settling zones. Another advantage is that whereas a Scheibel column is somewhat troublesome to assemble, a free space column according to the present invention can be fabricated in long lengths which are easily mounted or removed.

The general arrangement of a solvent extraction plant embodying a contacting column according to the present invention is diagrammatically illustrated in Figure 12. Oil is fed from feed tank 33 to the base of the column via the preheater 34 by means of pump 35 operated by motor 36, a thermometer 37 being located adjacent the outlet of preheater 34. Solvent is fed from the feed tanks 38 to the top of the column via the preheater 39 by means of pump 40 operated by motor 41, a thermometer 42 being located adjacent the outlet of the preheater 39. The extract phase is discharged into storage at 43 and the raffinate phase into storage at 44. The interface is controlled by the electrode 21 which forms part of a level control circuit 45 comprising a magnetic valve 46 in the extract exit pipe 24. A thermometer 47 is located in the outlet 30 from the water jacket 28. The rotor shaft 16 is driven by the motor 48 via gears 49 and the gear shaft 50 carries a contact breaker 51 forming part of a revolution counter circuit 52.

A column according to the present invention and comprising seven mixing and eight settling zones was used to process two oil feedstocks the physical properties of which are set out in Table 1 below. For all runs, an isothermal extraction temperature of 140° F. was employed.

TABLE 1

*Physical properties of oil feedstocks*

|  | Feed 1 | Feed 2 |
|---|---|---|
| Specific Gravity, 60°/60° F. | 0.9655 | 0.9300 |
| Kinematic Viscosity at 100° F., cs. | 1,265 | 82.8 |
| Kinematic Viscosity at 140° F., cs. | 248 | 27.5 |
| Kinematic Viscosity at 210° F., cs. | 37.4 | 7.9 |
| Viscosity Index | 43 | 54 |

Both feedstocks had been dewaxed by known means.
The results of processing feedstock No. 1 are set out in Table 2 below.

TABLE 2

| Extraction Temperature, °F. | Oil Feedrate, ml./hr. | Solvent Treatment, vol. Percent | Rotor Speed, R. P. M. | Raffinate Oil Yield, vol. Percent | V. I. | Numbers of Stages | H. E. T. S. (in.) |
|---|---|---|---|---|---|---|---|
| 140 | 500 | 150 | 600 | 75.8 | 72 | 4.7 | 4.0 |
|  |  |  | 700 | 74.2 | 72.5 | 6.4 | 3.0 |
|  |  |  | 800 | 73.9 | 73 | 6.8 | 2.8 |
|  |  | 300 | 700 | 62.9 | 80 | 7.5 | 2.5 |
|  |  |  | 800 | 65.2 | 79.5 | 7.0 | 2.7 |
|  |  |  | 900 | 66.6 | 78.5 | 5.7 | 3.3 |
|  | 250 | 100 | 800 | 80.0 | 68 | 5.5 | 3.5 |
|  |  | 150 | 800 | 75.2 | 72.5 | 6.8 | 2.8 |

It will be seen that the efficiency is slightly better at higher solvent treatments, although the oil feed rate appears to have little effect upon the efficiency. The optimum rotor speed is between 700 and 800 R. P. M.

A comparison between the results obtained by means of a column according to the present invention and those obtained by means of a similar column but in which the spaces between the mixing zones were entirely filled with 3/16" boot eyelet packing, is given in Table 3.

TABLE 3

[Feedstock: Feed 1.]

| Extraction Temperature, °F. | Oil Feedrate, ml./hr. | Solvent Treatment, vol. Percent | Rotor Speed, R. P. M. | Number of Stages | |
|---|---|---|---|---|---|
| | | | | "Free Space" Column | Boot Eyelet Packed Column |
| 140 | 500 | 100 | 200 | | 1.3. |
| | | | 300 | | 1.7. |
| | | | 400 | | 1.4. |
| | | | 600 | ¹4.7 | Flooding. |
| | | | 700 | ¹6.4 | Do. |
| | | | 800 | ¹6.8 | Do. |
| | | 300 | 200 | | 1.5. |
| | | | 300 | | 2.0. |
| | | | 400 | | 1.7. |
| | | | 700 | 7.5 | Flooding. |
| | | | 800 | 7.0 | Do. |
| | | | 900 | 5.7 | Do. |

¹ 150% solvent treatment.

It will be seen that much lower efficiencies were obtained with the packed column (especially at 300% treatment), since comparable rotor speeds (500–900 R. P. M.), could not be obtained without the column flooding.

In Table 4 below, the efficiency of the present column is compared with that of a "Scheibel" column of similar diameter having mixing zones alternating with settling zones packed with a roll of wire gauze.

TABLE 4

[Feedstock: Feed 1.]

| Extraction Temperature, °F. | Solvent Treatment, vol. Percent | Rotor Speed, R. P. M. | Number of Stages | |
|---|---|---|---|---|
| | | | "Scheibel" type column | "Free Space" column |
| 140 | 100 | 650 | 6.1 | |
| | 150 | 600 | | 4.7 |
| | | 700 | | 6.4 |
| | | 800 | | 6.8 |
| | 200 | 650 | 6.6 | |
| | 300 | 650 | 6.5 | |
| | | 700 | | 7.5 |
| | | 800 | | 7.0 |
| | | 900 | | ¹5.7 |
| | 400 | 650 | 6.4 | |

¹ Approaching flooding.

With the same feedstock (No. 1) and temperature, the efficiency of the present column is slightly greater than that of the Scheibel column, especially at the higher treatments, with comparable rotor speeds. The oil and solvent rates with the Scheibel column were half those of the present column.

In Table 5, the present column is compared with a conventional packed column of similar diameter having a packed height considerably greater than the height of the present column. The same feedstock and isothermal extraction temperature were employed in each case.

TABLE 5

| Extraction Temperature, °F. | Oil Feedrate, ml./hr. | Solvent Treatment, vol. Percent | Number of Stages | | H. E. T. S., inches | |
|---|---|---|---|---|---|---|
| | | | Rotary Column | Packed Column | Rotary Column | Packed Column |
| 140 | 500 | 100 | | 6.6 | | 21.8 |
| | | 150 | ¹6.8 | | 2.8 | |
| | | 200 | | 7.8 | | 18.5 |
| | | 300 | ¹7.5 | 16 | 2.5 | 9.0 |

¹ Optimum conditions i. e. rotor speed 700–800 R. P. M.

It will be seen that the height of an equivalent theoretical stage (H. E. T. S.) of the packed column is from 4 to 8 times as great as that of the rotary column.

The effect of varying the mesh of the gauze screens between the zones is set out in Table 6 using feedstock No. 1.

TABLE 6

| Extraction Temperature, °F. | Oil Feedrate, ml./hr. | Solvent Treatment, vol. Percent | Rotor Speed, R. P. M. | Number of Stages | |
|---|---|---|---|---|---|
| | | | | Gauze mesh 10 | Gauze mesh 20 |
| 140 | 500 | 100 | 600 | ¹4.7 | 5.3 |
| | | | 700 | ¹6.4 | 4.2 |
| | | | 800 | ¹6.8 | 5.3 |
| | | | 900 | | 2.8 |
| | 500 | 300 | 600 | | 4.5 |
| | | | 700 | 7.5 | |
| | | | 800 | 7.0 | 5.5 |
| | | | 900 | 5.7 | |
| | | | 1,000 | | 3.9 |

¹ 150% solvent treatment.

It will be seen that a 20 mesh gauze gave inferior results to a 10 mesh gauze. This was probably due to the fact that solvent built up on the lower gauze of the settling zone and did not pass directly through it into the next mixing zone except via the lower tube, hence interfering with the induced circulation caused by the rotating cone.

Two runs were carried out on the column both with and without the deflector cones employing feed No. 2. It is seen from Table 7 below that efficiencies are considerably reduced when the cones are not present.

TABLE 7

| Extraction Temperature, °F. | Oil Feedrate, ml./hr. | Solvent Treatment, vol. percent | Rotor Speed, R. P. M. | Number of Stages | |
|---|---|---|---|---|---|
| | | | | Without Deflector Cones | With Deflector Cones |
| 140 | 500 | 100 | 750 | 5.1 | 7.0 |
| | | 300 | 750 | 4.8 | 7.0 |

The comparison of column efficiency employing the two different positions of solvent inlet hereinbefore referred to is given in Table 8.

TABLE 8

| Extraction Temperature, °F. | Oil Feedrate, ml./hr. | Solvent Treatment, vol. percent | Rotor Speed, R. P. M. | Number of Stages | |
|---|---|---|---|---|---|
| | | | | Solvent Inlet in— | |
| | | | | Top Mixing Zone | Top Settling Zone |
| 140 | 500 | 100 | 200 | 1.65 | |
| | | | 400 | 2.9 | |
| | | | 600 | 2.25 | 2.6 |
| | | | 800 | Flooding | 3.4 |
| | | | 900 | do | 3.0 |
| | | 300 | 200 | 1.1 | |
| | | | 400 | 4.0 | |
| | | | 600 | 5.9 | 5.6 |
| | | | 700 | 6.8 | |
| | | | 800 | 7.2 | 6.5 |
| | | | 1,000 | 5.1 | 4.9 |
| | | | 1,200 | 3.5 | ¹0.6 |

¹ Column approaching flooding.

It is seen that little difference exists between the two except that at lower treatments a higher rotor speed is permissible when the solvent inlet is situated in the top settling zone.

The results of extracting two different oil feedstocks in the present column are compared in Table 9.

TABLE 9

| Extraction Temperature, °F. | Oil Feed rate, ml./hr. | Solvent Treatment, vol. percent | Rotor Speed, R. P. M. | Number of Stages | |
|---|---|---|---|---|---|
| | | | | Feed 1 | Feed 2 |
| 140 | 500 | 100 | 600 | ¹ 4.7 | 7.2 |
| | | | 700 | ¹ 6.4 | 7.0 |
| | | | 800 | ¹ 6.8 | 6.9 |
| | | | 500 | | 6.0 |
| | | | 600 | | 6.8 |
| | | 300 | 700 | 7.5 | 7.0 |
| | | | 800 | 7.0 | 7.0 |
| | | | 900 | ² 5.7 | |

¹ 150% treatment.
² Column approaching flooding.

It will be seen that despite the large difference in viscosity between the two feedstocks the column efficiency is practically independent of the feedstock.

In Table 10, the limiting liquid throughputs are set out for three different 1″ diameter columns consisting of a rotary column according to the present invention, a boot eyelet packed rotary column and a conventional packed column having 12 ft. extraction height.

TABLE 10

[Feed employed: Feed I.]

| Extraction Temperature, °F. | Rotor Speed, R. P. M. | Solvent Treatment, vol. Percent | Flooding occurred with an oil feed rate (ml./hr.) of— | | |
|---|---|---|---|---|---|
| | | | "Free Space" Rotary Column | Boot Eyelet Packed Rotary Column | Conventional Packed Column |
| 140 | 0 | 100 | about 1,000 | 500 to 750 | |
| | 600 | 100 | about 750 | | |
| | 0 | 200 | about 1,000 | | |
| | 600 | 200 | about 750 | | |
| | 0 | 100 to 300 | above 1,000 | | |
| 150 | 600 | 100 | 1,500 to 1,750 | | 1,550 |
| | 600 | 200 | about 2,000 | | 2,100 |
| | 600 | 300 | above 2,000 | | 2,700 |

From the results at 140° F. it is clear that the throughput of the column according to the present invention is greater than the packed rotary column and at 150° F. the column according to the present invention has approximately the same throughput as a conventional packed column over the treatment range investigated.

We claim:
1. Apparatus for the countercurrent extraction of a liquid mixture by means of a selective solvent, consisting of a vertical column, a rotatable shaft located within said column, horizontal perforated partitions within said column and dividing the column into a plurality of superimposed zones, mixing means secured to said shaft and located in alternate zones only, which are thereby constituted as mixing zones, aligned tubular means concentric with said shaft and secured to said horizontal perforated partitions at one end with the opposite end extending into the alternate complementary zones for passing the mixture from a central position in said mixing zones into a central position in the complementary alternate zones, said last mentioned means being in annularly spaced relation to said shaft and having said opposite ends extending toward one another and terminating a short distance from each other in said complementary alternate zones, and baffle means secured to said rotatable shaft and located between the adjacent ends of said aligned tubular means, means for passing the mixture from said mixing zones, said baffle means directing the mixture outwardly within said complementary alternate zones which are thereby constituted as settling zones.

2. Apparatus for the countercurrent extraction of a liquid mixture by means of a selective solvent, comprising a vertical column, horizontal perforated partitions within said column and dividing the column into a plurality of superimposed zones, said horizontal perforated partitions being formed with aligned apertures therein, a rotatable shaft passing through said column via said apertures, mixing means secured to said shaft and located in alternate zones only, which are thereby constituted as mixing zones, aligned tubular members secured to said perforated partitions at one end with the opposite ends extending into the alternate complementary zone, said tubular members being concentric with and in annularly spaced relation to said shaft for passing the mixture from a central position in said mixing zone into a central position in the complementary alternate zones, said tubular members having said opposite ends extending toward one another and terminating a short distance from each other in said complementary alternate zones, and baffle means secured to said shaft and located in the complementary alternate zones between the adjacent ends of said tubular members, said baffle means forcing the mixture passing through said tubular members from the adjacent mixing zones outwardly within the complementary alternate zones which are thereby constituted as settling zones.

3. Apparatus for the countercurrent extraction of a liquid mixture by means of a selective solvent comprising a vertical column, horizontal perforated partitions within said column and dividing the column into a plurality of superimposed zones, said horizontal perforated partitions being formed with aligned apertures therein, a rotatable shaft passing through said column via said apertures, mixing means secured to said shaft and located in alternate zones, which are thereby constituted as mixing zones, aligned tubular members concentric with said shaft and secured in the apertures in said perforated partitions, said tubular members being located in the complementary alternate zones and terminating a short distance from each other, and double-conical baffles secured to said shaft and located in the complementary alternate zones between the adjacent ends of said tubular members, said double-conical baffles being located with their apices directed towards the ends of said tubular members thereby forcing the mixture passing through said tubular members from the adjacent mixing zones outwardly within the complementary alternate zones which are thereby constituted as settling zones.

4. Apparatus for the countercurrent extraction of a liquid mixture by means of a selective solvent comprising a vertical column, horizontal perforated partitions within said column and dividing the column into a plurality of superimposed zones, said horizontal perforated partitions being formed with aligned apertures therein, a rotatable shaft passing through said column via said apertures, mixing means secured to said shaft and located in alternate zones, which are thereby constituted as mixing zones, aligned tubular members concentric with said shaft and secured in the apertures in said perforated partitions, said tubular members being located in the complementary alternate zones and terminating a short distance from each other, and double-conical baffles secured to said shaft and located in the complementary alternate zones between the adjacent ends of said tubular members, said baffles forcing the mixture passing through said tubular members from the adjacent mixing zones outwardly within the complementary alternate zones which are thereby constituted as settling zones, the upper tubular members in said settling zones being longer than the lower tubular members in said zones.

5. Apparatus for the countercurrent extraction of a liquid mixture by means of a selective solvent comprising a vertical column, horizontal perforated partitions within said column and dividing the column into a plurality of superimposed zones, said horizontal perforated partitions being formed with aligned apertures therein, a rotatable shaft passing through said column via said apertures, mixing means secured to said shaft and located in alternate zones, which are thereby constituted as mixing zones, aligned tubular members concentric with said shaft and secured in the apertures in said perforated partitions, said tubular members being located in the complementary alternate zones and terminating a short distance from each other, double conical baffles secured to said shaft and located in the complementary alternate zones between the adjacent ends of said tubular members, said baffles forcing the mixture passing through said tubular members from the adjacent mixing zones outwardly within the complementary alternate zones which are thereby constituted as settling zones, means for supplying a liquid mixture to the base of the column, and means for supplying a selective solvent to the top of the column.

6. Apparatus for the countercurrent extraction of a liquid mixture by means of a selective solvent comprising a vertical column, horizontal perforated partitions within said column and dividing the column into a plurality of superimposed zones, said horizontal perforated partitions being formed with aligned apertures therein, a rotatable shaft passing through said column via said apertures, mixing means secured to said shaft and located in alternate zones, which are thereby constituted as mixing zones, aligned tubular members concentric with said shaft and secured in the apertures in said perforated partitions, said tubular members being located in the complementary alternate zones and terminating a short distance from each other, double conical baffles secured to said shaft and located in the complementary alternate zones between the adjacent ends of said tubular members, said baffles forcing the mixture passing through said tubular members from the adjacent mixing zones outwardly within the complementary alternate zones which are thereby constituted as settling zones, means for supplying a liquid mixture to the bottom mixing zone, and means for supplying a selective solvent to the top settling zone.

7. Apparatus for countercurrent extraction of a liquid mixture by means of a selective solvent, comprising a vertical column divided into a plurality of alternate mixing and settling zones by means of horizontal perforated partitions having aligned apertures therein, a rotatable shaft passing through said apertures, mixing devices mounted on said shaft and located in said mixing zones only, stationary tubular means located in the settling zones around the apertures in said perforated partitions and in annularly spaced concentric relation to said shaft and secured to said portions at one end with the opposite ends extending into the alternate settling zones, and having said opposite ends extending toward one another and terminating a short distance from each other in said settling zone for passing the mixture from each mixing zone along confined central unobstructed paths into the complementary alternate settling zones, and means also located in the settling zones for causing the mixture thus delivered to the settling zones to be directed outwardly within said zones.

References Cited in the file of this patent

UNITED STATES PATENTS

| | | |
|---|---|---|
| 1,993,446 | Huff | Mar. 5, 1935 |
| 2,000,606 | Othmer | May 17, 1935 |
| 2,072,382 | Robinson | Mar. 2, 1937 |
| 2,266,521 | Van Dijck | Dec. 16, 1941 |
| 2,493,265 | Scheibel | Jan. 3, 1950 |
| 2,569,391 | Stearns | Sept. 25, 1951 |

FOREIGN PATENTS

| | | |
|---|---|---|
| 566,945 | Germany | Dec. 28, 1932 |